(12) United States Patent
Childers et al.

(10) Patent No.: US 8,793,102 B2
(45) Date of Patent: Jul. 29, 2014

(54) MULTI-GAP INTERFEROMETRIC SENSORS

(75) Inventors: Brooks A. Childers, Christiansburg, VA (US); Robert M Harman, Troutville, VA (US); Daniel S. Homa, Blacksburg, VA (US); Lance A. Beckner, Roanoke, VA (US)

(73) Assignee: Baker Hughes Incorporated, Houston, TX (US)

( * ) Notice: Subject to any disclaimer, the term of this patent is extended or adjusted under 35 U.S.C. 154(b) by 285 days.

(21) Appl. No.: 12/772,253

(22) Filed: May 3, 2010

(65) Prior Publication Data

US 2011/0172959 A1 Jul. 14, 2011

Related U.S. Application Data

(60) Provisional application No. 61/294,240, filed on Jan. 12, 2010.

(51) Int. Cl.
*G06F 17/18* (2006.01)

(52) U.S. Cl.
USPC ............................ 702/179; 702/130; 702/138

(58) Field of Classification Search
USPC ...................... 702/179, 2, 130, 138
See application file for complete search history.

(56) References Cited

U.S. PATENT DOCUMENTS

| | | | | |
|---|---|---|---|---|
| 5,015,844 A * | 5/1991 | Cole | ........ | 250/227.24 |
| 5,044,723 A | 9/1991 | MacDonald | | |
| 5,301,001 A | 4/1994 | Murphy et al. | | |
| 5,909,273 A * | 6/1999 | Malvern | ........ | 356/35.5 |
| 6,055,080 A | 4/2000 | Furstenau et al. | | |
| 6,056,436 A * | 5/2000 | Sirkis et al. | ........ | 374/161 |
| 6,069,686 A | 5/2000 | Wang et al. | | |
| 6,097,478 A | 8/2000 | Berthold et al. | | |
| 6,452,667 B1 | 9/2002 | Fernald et al. | | |
| 6,630,658 B1 * | 10/2003 | Bohnert et al. | ........ | 250/227.14 |
| 6,687,011 B1 | 2/2004 | Lee et al. | | |
| 7,104,141 B2 | 9/2006 | Zerwekh et al. | | |
| 7,421,905 B2 * | 9/2008 | Zerwekh et al. | ........ | 73/800 |
| 2002/0159671 A1 | 10/2002 | Boyd et al. | | |
| 2005/0013526 A1 | 1/2005 | Lee et al. | | |
| 2006/0289724 A1 | 12/2006 | Skinner et al. | | |

FOREIGN PATENT DOCUMENTS

KR 199914611 4/1999

OTHER PUBLICATIONS

Ultra-strong regenerated gratings, J. Canning, University of Sydney, NSW, 2006 Australia.*
International Search Report and Written Opinion for Application No. PCT/US2011/031402 dated Oct. 20, 2011.

(Continued)

*Primary Examiner* — Michael Nghiem
*Assistant Examiner* — Ivan Rabovianski
(74) *Attorney, Agent, or Firm* — Cantor Colburn LLP

(57) ABSTRACT

An apparatus for estimating a property includes a hollow core tube and an input light guide disposed at least partially within hollow core tube. The apparatus also includes a second gap disposed within the hollow core tube and separated from the input light guide by an air gap width. The second gap is formed of a first solid material and has a second gap width. The apparatus also includes a third gap disposed at least partially within the hollow core tube and being further from the input light guide than the second gap. The third gap is formed of a second solid material and has a third gap width.

16 Claims, 5 Drawing Sheets

(56) References Cited

OTHER PUBLICATIONS

Didomenico, L., et al.; "Quantum Interferometric Sensors"; Proc. of SPIE, vol. 5359, p. 169-176, 2004.

Kujawinska, M., et al., "New Generation of Full-Field Interferometric Sensors", Proceedings of the Symposium on Photonics Technologies for 7th Framework Program, p. 463-466, 2006.

Sathitanon, N., et al., "A Fiber Optic Interferometric Sensor for Dynamic Measurement", International Journal of Computer Science and Engineering, vol. 2, No. 2; p. 63-66, Feb. 2008.

Leng, J.S., et al.; "Structural Health Monitoring of Concrete Cylinders Using Protected Fibre Optic Sensors"; Institute of Physics Publising, Smart Materials and Structures; vol. 15, p. 302-308; 2006.

Park, S.W.; et al.; "Feedback Controlled Nano-Positioner Using Fiber Optic EFPI Sensor with Novel Demodulation Technique"; Proceedings of SPIE—The International Society for Optical Engineering, v.5763, pp. 284-290, Smart Structures and Materials 2005.

International Search Report and Written Opinion dated Aug. 18, 2011 for Application No. PCT/US2010/062003.

* cited by examiner

MULTI-GAP INTERFEROMETRIC SENSORS

CROSS-REFERENCE TO RELATED APPLICATIONS AND PRIORITY CLAIM

This application claims the benefit of U.S. Provisional Application Ser. No. 61/294,240, entitled "IMPROVED EFPI SENSOR", filed Jan. 12, 2010, under 35 U.S.C. §119 (e), and which is incorporated herein by reference in its entirety.

BACKGROUND OF THE INVENTION

1. Field of the Invention

The present invention relates to an improved Extrinsic Fabry-Perot Interferometer (EFPI) sensor. More particularly, the EFPI sensor is configured to be disposed in a borehole penetrating the earth.

2. Description of the Related Art

In exploration and production of hydrocarbons, it is often necessary to drill a borehole into the earth to gain access to the hydrocarbons. Equipment and structures, such as borehole casings for example, are generally disposed into a borehole as part of the exploration and production. Unfortunately, the environment presented deep into the borehole can place extreme demands upon the equipment and structures disposed therein. For example, the equipment and structures can be exposed to high temperatures and pressures that can effect their operation and longevity.

Because optical fibers can withstand the harsh downhole environment, sensors using optical fibers are often selected for downhole applications. One type of sensor using optical fibers is the Extrinsic Fabry-Perot Interferometer (EFPI) sensor. The EFPI sensor can measure pressure or temperature for example by measuring a displacement of one optical fiber in relation to another optical fiber.

An example of a prior art EFPI sensor 10 is illustrated in FIG. 1. The EFPI sensor 10 includes a capillary tube 11. Disposed within the capillary tube 11 at one end is a single-mode optical fiber 12. Disposed at the other end of the hollow core fiber 11 is a multimode optical fiber 13. A Fabry-Perot (FP) cavity is formed between the ends of the optical fibers 12 and 13 within the capillary tube 11. The single mode optical fiber 12 provides input light to the FP cavity and receives light reflections from the FP cavity. The multimode optical fiber 13 acts as a reflector. The capillary tube 11 is configured to guide the optical fibers 12 and 13 to and from each other based on the application of an external force while maintaining their alignment.

The input light enters the single mode optical fiber 12 and is partially reflected by a first glass-to-air interface 14 to produce first reflected output light 15. The input light not reflected by the first glass-to-air interface 14 travels through the FP cavity and is reflected by a second glass-to-air interface 16 to produce second reflected output light 17. The first reflection output light 15 interferes with the second reflection output light 17 to create an interference pattern or interferogram that depends on a difference in the optical path lengths traveled by the reflection output light 15 and 17. The intensity of total output light due to the interference pattern is related to the difference between the two optical paths. By measuring the intensity of the total light output the displacement of the single mode optical fiber 12 with respect to the multimode optical fiber 13 can be measured. Hence, a property such as temperature or pressure can be estimated by measuring a change in intensity of the total light output.

BRIEF SUMMARY OF THE INVENTION

Disclosed is an apparatus for estimating a property. The apparatus includes a hollow core tube and an input light guide disposed at least partially within hollow core tube. The apparatus also includes a second gap disposed within the hollow core tube and separated from the input light guide by an air gap width. The second gap is formed of a first solid material and has a second gap width. The apparatus also includes a third gap disposed at least partially within the hollow core tube and being further from the input light guide than the second gap. The third gap is formed of a second solid material and has a third gap width.

Also disclosed is a system for estimating a property that includes a hollow core tube and an input light guide disposed at least partially within hollow core tube. The system also includes a second gap disposed within the hollow core tube and separated from the input light guide by an air gap width. The second gap is formed of a first solid material and has a second gap width. The system also includes a third gap disposed at least partially within the hollow core tube and being further from the input fiber than the second gap. The third gap is formed of a second solid material and has a third gap width. In addition, the system includes a light source in optical communication with the input light guide and configured to transmit an input light signal and a light detector in optical communication with the input fiber and configured to detect light reflections of the input light signal wherein the light reflections are related to the air gap, the second gap and the third gap.

Further disclosed is a computer based method for estimating a property that includes: receiving at a computing device a series of data values based on an amplitude of reflected light from a sensor that includes an air gap, a second gap and a third gap; providing an estimate of a width of the air gap, an estimate of a width of the second gap, and an estimate of a width of the third gap to a curve fitting algorithm on the computing device; receiving intermediate gap widths for the second and third gaps; verifying the intermediate gap width for the third gap to create a verified third gap width; and providing a revised estimate of the width of the air gap to the curve fitting algorithm, the revised estimate being based on the verified third gap.

BRIEF DESCRIPTION OF THE DRAWINGS

The subject matter, which is regarded as the invention, is particularly pointed out and distinctly claimed in the claims at the conclusion of the specification. The foregoing and other features and advantages of the invention are apparent from the following detailed description taken in conjunction with the accompanying drawings, wherein like elements are numbered alike, in which:

DETAILED DESCRIPTION OF THE INVENTION

Figure 1:
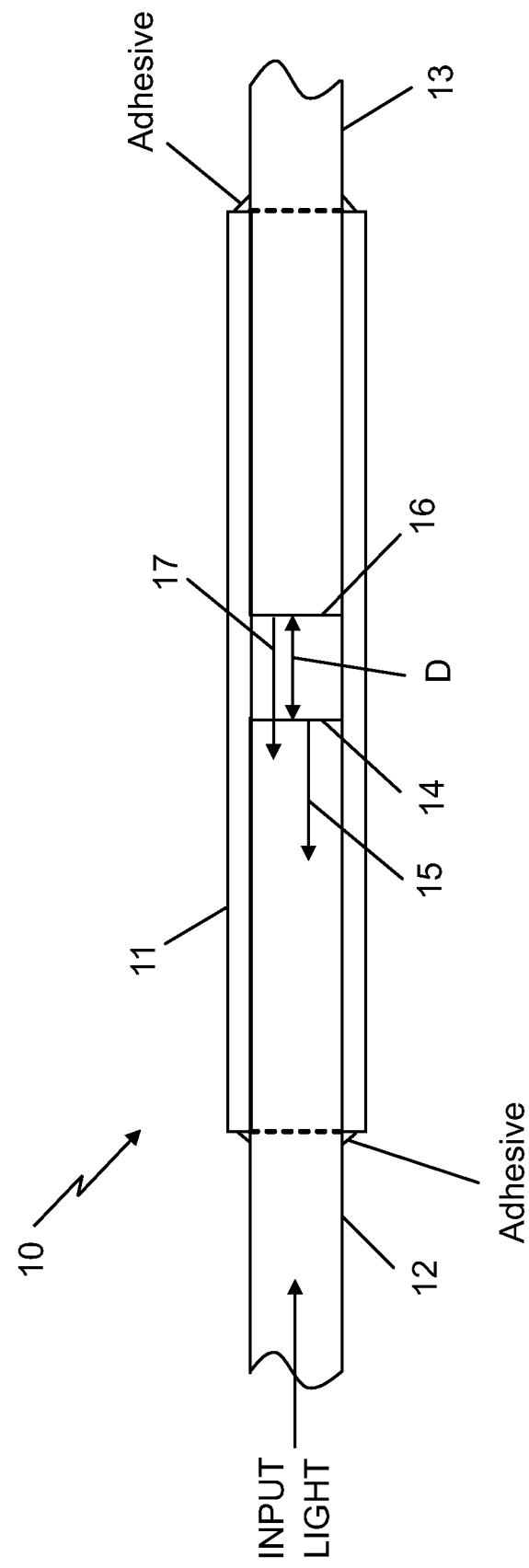
FIG. 1 illustrates a prior art EFPI sensor.
Figure 2:
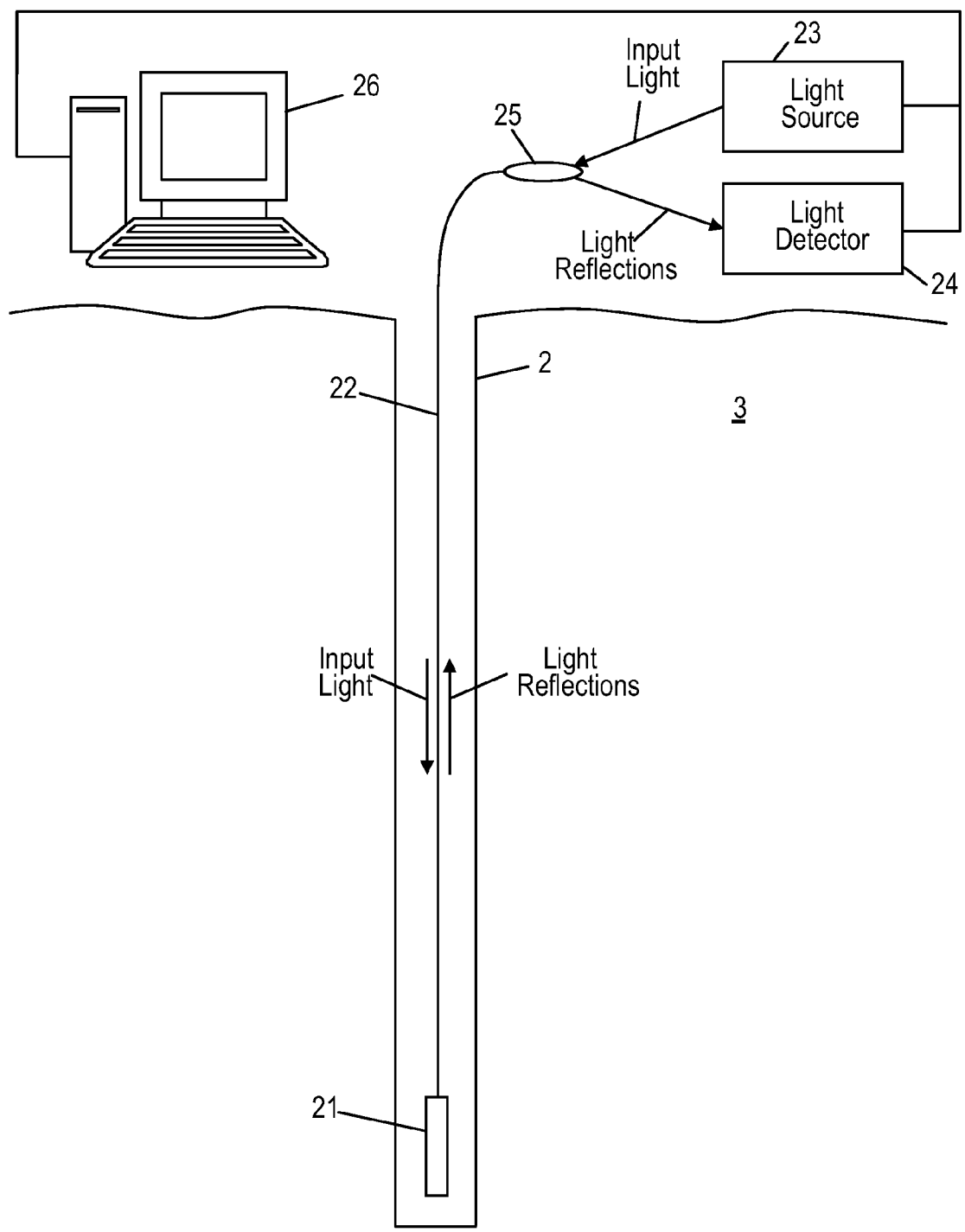
FIG. 2 illustrates an exemplary embodiment of an EFPI sensor system with the sensor disposed in a borehole penetrating the earth.

Reference may now be had to FIG. 2. FIG. 2 illustrates an exemplary embodiment of an EFPI sensor system 20. The EFPI sensor system 20 includes an EFPI sensor 21 configured to be disposed in a borehole 2 penetrating the earth 3. Being configured for operation in the borehole 2 includes being operable at the high temperatures and pressures encountered downhole.

Still referring to FIG. 2, the EFPI sensor 21 is coupled to surface optoelectronics by way of a communication optical fiber 22. In an alternative embodiment, some or all of the optoelectronics can be disposed downhole. The surface optoelectronics include a light source 23, such as a laser diode, and a light detector 24. The light source 23 is configured to transmit input light to the EFPI sensor 21 while the light detector 24 is configured to receive and measure light reflections from the sensor 21. An optical coupler 25 is configured to couple the light source 23 and the light detector 24 to the communications optical fiber 22. A computer processing system 26 may be coupled to the light source 23 and the light detector 24 and configured to operate the EFPI sensor system 20. In addition, the computer processing system 26 may process interference patterns generated by light reflections from the EFPI sensor 21 to estimate a property being measured.

As discussed above, EFPI sensors may produce sinusoidal interference patterns where the phase is dependent on a parameter of interest that modulates the optical path length, e.g. physical length or refractive index. Due to the periodic nature of the sinusoidal pattern, the values of the parameters recovered by current algorithms and current sensors can have discrete errors based on mis-interpretation of the interferometric fringe order. A zero order fringe represents zero optical path difference and a first order fringe represents an optical path difference of one mean wavelength of the light source. These fringe order misinterpretations are colloquially termed "solution jumps" and may be a source of errors. Also, due to the possibility of solution jumps, such sensors cannot be properly classified as absolute sensors since once the fringe misinterpretation exists it can persist requiring additional information to get back on the right fringe order.

Embodiments presented herein may provide a multi-gap sensor and method that reduces or eliminates the above-described problems. In one embodiment, the sensor includes at least three "gaps." A "gap," as the term is used herein, refers to a width of a material or air disposed between two reflection surfaces. The reflections may be caused, for example, by a transition from a solid to air or vice versa, a reflective material displaced in the optical path, or a change in material forming the optical path.

Figure 3:
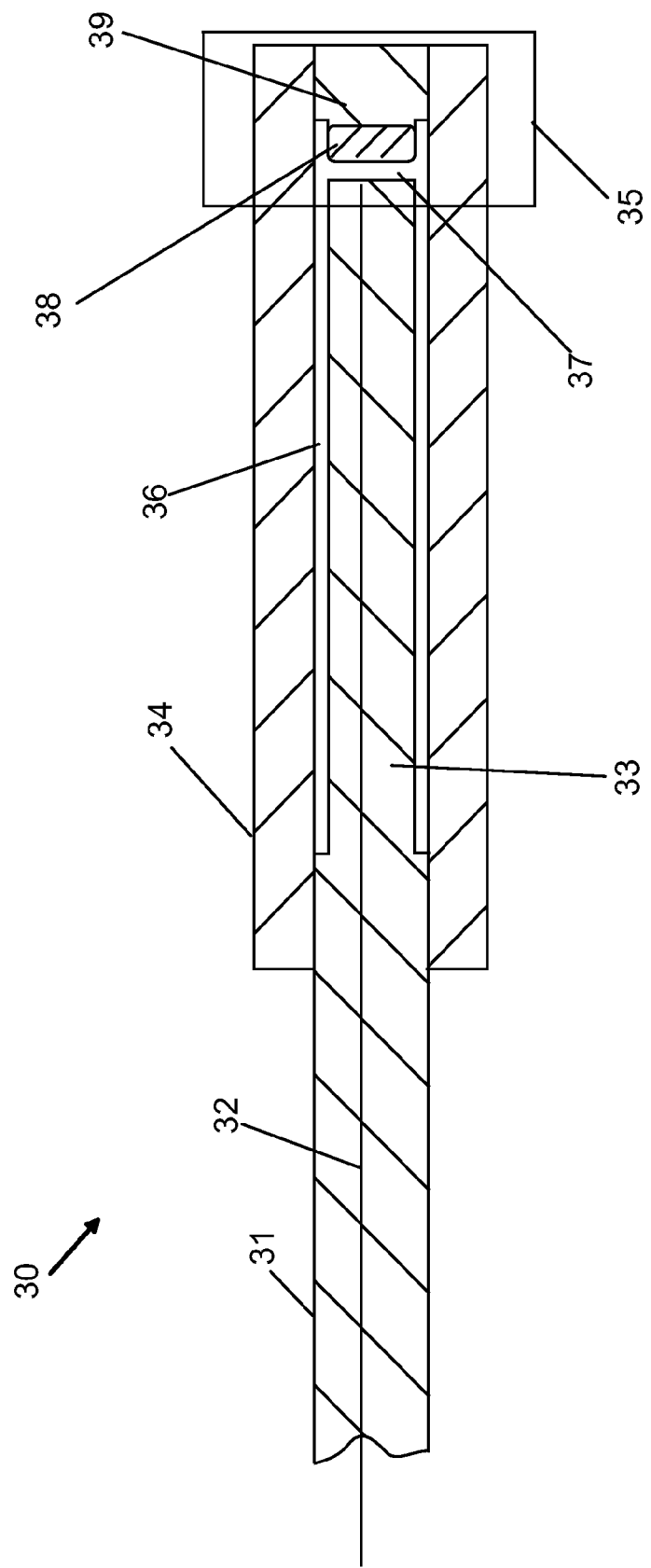
FIG. 3 illustrates an example of an EFPI sensor according to one embodiment.

FIG. 3 shows a cut-away side view of an EFPI sensor 30 according to one embodiment. In more detail, the EFPI sensor ("sensor") includes input light guide 31. The input light guide 31 may include an optical waveguide core 32 in one embodiment. Of course, the waveguide core 32 could be omitted in one embodiment. The optical waveguide core 32 may be a single mode optical fiber that provides input light to the sensor and receives light reflections from the multiple gaps of the sensor 30. The input light guide 31 may have an internal portion 33 disposed within the hollow core tube 34. The hollow core tube 34 may have a circular cross-section in one embodiment. Of course, the hollow core tube 34 could have other cross-sections. In one embodiment, the hollow core tube 34 is formed of a glass material. In one embodiment, the internal portion 33 has a smaller outer diameter than the hollow core tube 34. In such an embodiment, the outer diameter of the internal portion may be smaller than an inner diameter of the hollow core tube 34 such that a compression gap 36 exists there between. The compression gap 36 protects the internal portion 33 from compression when the sensor 30 is exposed to pressure.

In another embodiment, the input fiber 31 includes a taper from the first portion 31 to an end of the internal portion 33 to prevent contact between each of the input fiber and the hollow core tube 34. The taper may isolate the inner surface of the hollow core tube 34 for 360 degrees about the longitudinal axis of from the first fiber 31. Hence, the internal portion 33 in FIG. 3 may be described as being "perimetrically" (i.e., related to the perimeter) isolated from the hollow core tube 34. In one embodiment, a solution of hydrofluoric acid can be used to etch the optical fiber 31 to produce the taper.

The sensor 30 may also include a gap region 35. The gap region 35 may include an air gap 37. The air gap 37 separates the first fiber from two or more materials which cause two or more reflections. As shown in FIG. 3, the two materials, first material 38 and second material 39 form the second and third gaps described below and cause three reflections. The reflections are shown in greater-detail below.

The two materials 38 and 39 are typically fused or otherwise joined together or are formed of the same material with a reflector disposed between them. In one embodiment, the second material 39 is fused or otherwise joined to the hollow core tube 34. In one embodiment, the hollow core tube 34 and one or both of the first material 38 and second material 39 are formed of a glass or glass like material.

When the sensor 30 is subjected to changes in pressure (e.g., a hydrostatic pressure), the size of the entire sensor 30 may vary. In particular, the hollow core tube 34 may compress as pressure increases. In addition, the second material 39 may compress as pressure increases as well. However, in one embodiment, due to the compression gap 36, the internal portion 33 and the first material 38 may not compress as pressure increases. In addition, due to the compression of the hollow core tube 34, the width of the air gap 37 may become smaller.

Typical prior art EFPI sensor had only one or two optical path lengths. The path lengths were demodulated to recover temperature and some other parameter, such as pressure. To alleviate the solution jumps mentioned above, in one embodiment, the gap region 35 may include three or more gaps. In one embodiment, the gap region 35 includes only three gaps.

In one embodiment, the hollow core tube 34 has an outer diameter of about two millimeters. Accordingly, when the outer diameter of the hollow core tube 34 is two millimeters, the optical fibers disposed within the tube 34 will have outer diameters less than one millimeter taking into account the wall thickness of the tube 34.

In one embodiment, the EFPI sensor 30 is fabricated as a micro-electromechanical system (MEMS) using techniques used for fabricating semiconductor devices. Exemplary embodiments of these techniques include photolithography, etching and micromachining.

Figure 4:
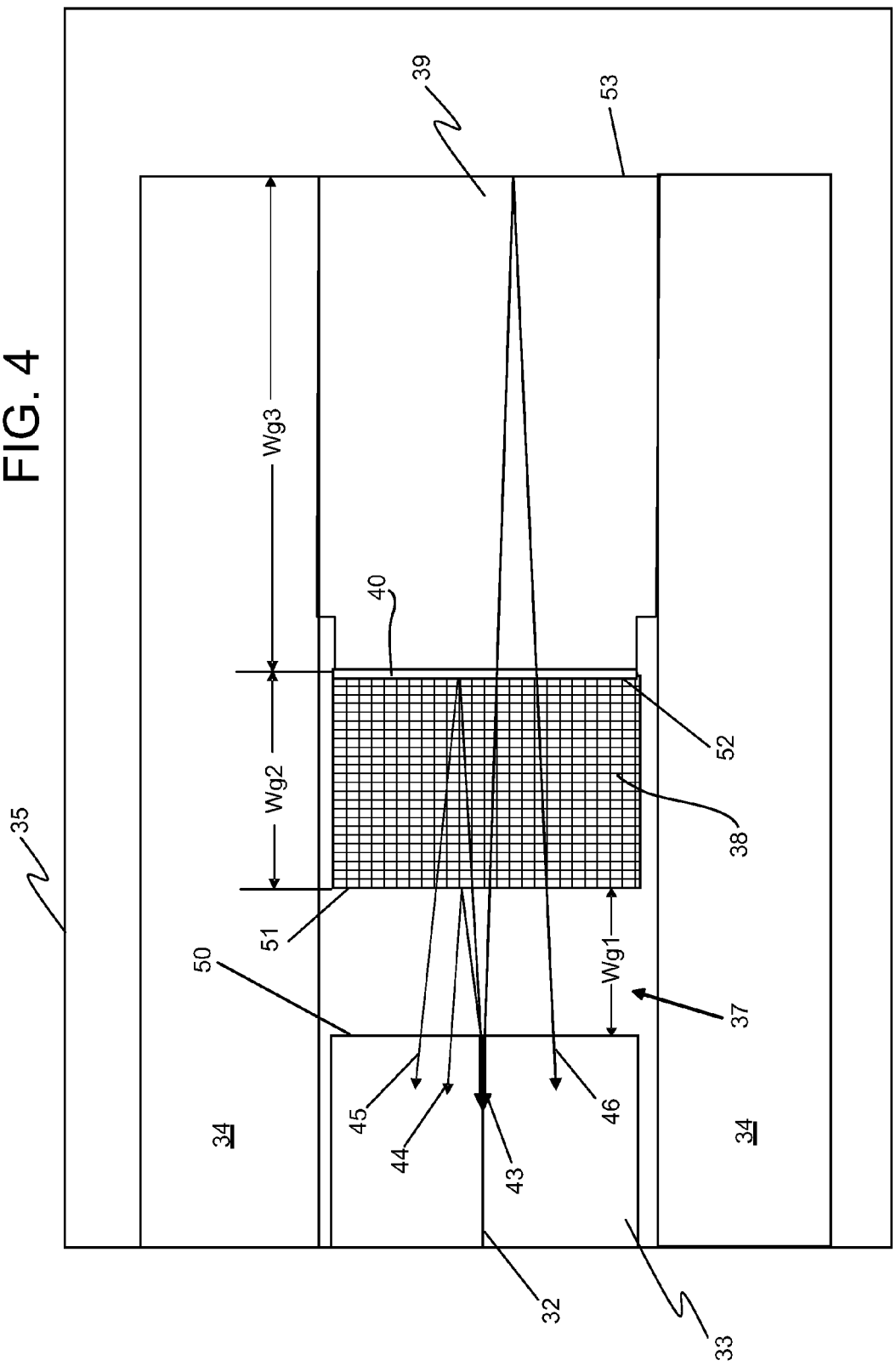
FIG. 4 shows a gap region of the sensor shown in FIG. 3.

FIG. 4 shows a detailed view of the gap region 35 shown in FIG. 3. The gap region 35 includes an air gap 37 having a gap width of Wg1, a second gap having a width of Wg2 and formed by the first material 38 and a third gap having a width of Wg3 and formed by the second material 39. As discussed above, the compression (or expansion) of the air gap 37 and the second material 39 due to pressure variations will cause variations in their respective gap widths. The transitions between the internal portion 33 and the air gap 37, the air gap 37 and the second material 38, and the second material 38 and the third material 39 define three reflection surfaces, a first reflection surface 50, a second reflection surface 51 and a third reflection surface 52, respectively. A fourth reflection surface 53 is formed by the transition from the third material 39 and air or some other material.

In more detail, the air gap 37 exists between the internal second portion 33 and the first material 39 and has a width of Wg1. Stated differently, the air gap 37 has a width Wg1 defined as the distance between the first reflection surface 50 and the second reflection surface 51. The first reflection surface 50 causes a first reflection 43 and the second reflection surface 51 causes the second reflection 44. The first reflection 43 interferes with the second reflection 44 to create an interference pattern or interferogram that depends on a difference in the optical path lengths traveled by the first reflection 43. This difference is equal to Wg1.

Similarly, the junction between the first material 38 and the second material 39 at third reflection surface 52 causes a third reflection 45. This third reflection 45 also causes interference that can be utilized to determine the Wg2. For ease of discussion, the second material 38 may also be referred to as the second gap.

Finally, the junction between the second material 39 and the external environment at the fourth refection surface 53 causes a fourth reflection 46. This fourth reflection 46 also causes interference that can be utilized to determine the Wg3. For ease of discussion, the second material 39 may also be referred to as the third gap.

In one embodiment, the divider 40 is an optical reflector. In such an embodiment, the first material 38 and second material 39 may be formed of the same material. The divider 40 may include gold, titanium oxide or silicon nitride to cause reflections at the junction of the second and third materials, 38 and 39, respectively, resulting in the third reflection 45. The divider 40 could also be one of a class of broadband multi-layer dielectric reflectors.

In another embodiment, the first material 38 has a different refractive index than the second material 39. The difference in indicies causes the third reflection 45. In such an embodiment, the divider 40 may be omitted. In one embodiment, the first material 38 and the second material 39 are both a glass or glass-like material. For example, both the first material 38 and the second material 39 may be formed of silica. In another embodiment, the first material 38 could be a non-glass amorphous or crystalline material such as, for example, silicon.

In operation, pressure is applied to outside of the sensor 30 (FIG. 3). This pressure may cause compression of the tube 34 and to the third gap 39. The first material (second gap) 38, however, is not directly coupled to a pressure. Accordingly, the width Wg2 of the second material 38 may be utilized as a temperature gauge. Both the air gap 37 and the second material (third gap) 39 may be utilized as pressure gauges. In one embodiment, the third gap gives a rough estimate of the pressure and the air gap 37, based on the rough estimate, is utilized for more precise pressure measurements.

It shall be understood that the configuration shown in FIG. 4 is illustrative only. For example, the dispersion of the light beams from the core 32 and the angle and position of the reflections is not meant to be limiting. In addition, in one embodiment, the core 32 may be omitted in the event that collimated light is provided to the sensor 30.

In operation, in order to determine the values of $W_{g1}$, $W_{g2}$, and $W_{g3}$, actual data points are collected and then curve-fitting techniques may be employed. In one embodiment, non-linear least squares fitting technique may be employed.

As one of ordinary skill will realize, non-linear curve fitting techniques require initial estimates for the unknown variables. In addition, the temperature is typically required to perform a temperature compensation step. To achieve the precision desired, the gap width changes typically are many multiples of the source mean wavelength span and covers many fringe orders. If the first and second materials are configured (i.e., sized) such that their widths may only change by less than one fringe order over any expected temperature or pressure variation, the recovered gap widths determined in a first stage of the algorithm described below may be used to seed a second stage of the algorithm with sufficient accuracy to guarantee both a unique solution and the desired precision. To this end, the widths of the second and third gaps, $W_{g2}$ and $W_{g3}$, respectively, may be selected such that over any expected temperature or pressure change, these widths will not vary more than one fringe order.

In one embodiment, the sensor 30 may be formed such that the air gap 37 has a width of about 160 um, the first material 38 has a width of about 300 um, and the second material 39 has a width of about 700 um. Of course, these values could change based on the material being used and the expected external conditions the sensor 30 may experience.

According to one embodiment, a two-stage method of determining the widths of the gaps is utilized. In the first stage, an initial solution is found for all the gaps $W_{g1}$, $W_{g2}$ and $W_{g3}$. Given that the width of the first and second materials cannot vary by more than a single fringe order, the initial solutions for those values (Wg2 and Wg3) may be corrected by adding or subtracting an integer multiple of half the mean wavelength of the source to place the gap values $W_{g2}$ and $W_{g3}$ in the correct physical range. The algorithm is repeated and all the resulting gap values recovered are on the correct absolute fringe order allowing accurate and high precision values to be obtained.

In the prior art when only two gaps (an air gap for pressure and a solid gap for temperature) were used, a Fourier transform of the output signal may have been utilized to determine its frequency content. From the frequency content, an estimate of the gap widths was created. These estimates were then used in the curve fitting technique as a starting point. The result of the curve fitting gave solutions for gap widths and, thus, the measurement of the physical property interest. However, as described above, the variation of the gaps may be greater than a fringe length. As such, these results could include solution jumps.

Figure 5:
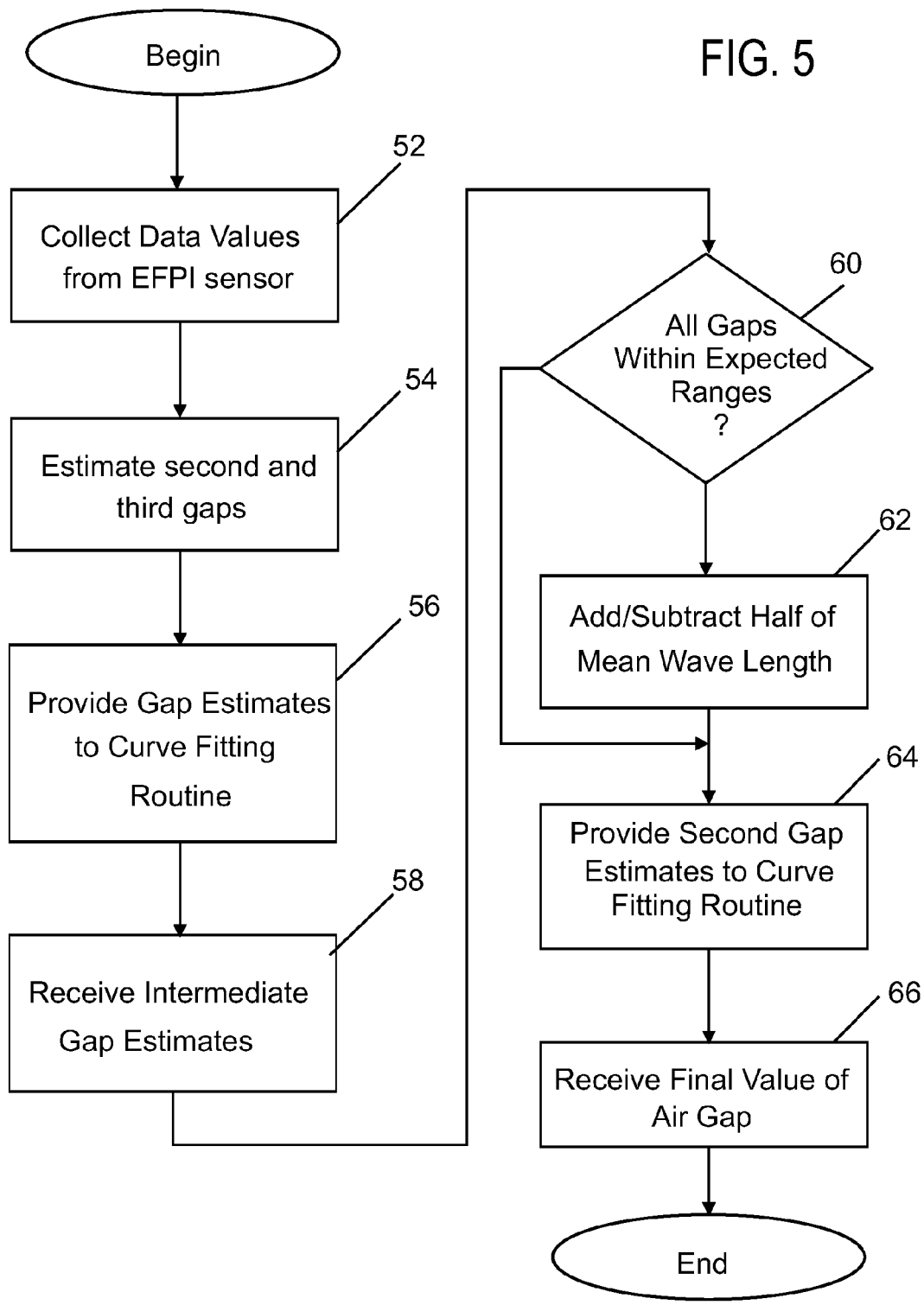
FIG. 5 is a flow diagram of a method according to one embodiment.

FIG. 5 shows a flow chart of a method according to the present invention. At a block 52 a series of data values are collected. These data values may be based, for example, on measurements of the output as the frequency of the input light is varied. In the prior art, it was from these values that the spectral content was gathered and thus, from which the initial estimates for the gaps was made for curve fitting. In one embodiment, the data values are received from a sensor having at least three gaps. In one embodiment, the sensor has one air gap and two gaps (second and third gaps) formed by solid materials.

At a block 54 an estimate for the second and third gaps is created. This estimate may be formed in many manners. In one embodiment, Fourier analysis may be utilized in the estimate. In another embodiment, in the event that the widths of the second and third gaps are selected such that they cannot vary more than fringe order, an estimate for these variables may be obtained by selecting any value in the width variation range of the gap width. For example, the estimate may be from the middle of the width variation value. In one embodiment, a value in the middle of the air gap variation range may be selected.

At a block 56, the gap width estimates are provided to a curve fitting technique. Of course, other values, such as the reflectivity of each of the surfaces and the mode field radius of the input waveguide may be provided.

At a block 58 intermediate gap widths for the two solid material gaps are received as a result of the curve fitting technique. The air gap width may also be received but may be ignored in one embodiment. At a block 60 it is determined if either of the two solid material gap values are out of the possible range. If so, half the mean wavelength of the input light is added or subtracted until the values are within the possible ranges at a block 62. Otherwise, processing proceeds to block 514. Blocks 60 to 62 may be referred to as "verifying" the gaps.

At block 64 the curve fitting technique is again applied. In this iteration, the length of the third gap as finally determined at either block 58 or 62 is converted to a corresponding air gap width. The values for the second and third widths used in this iteration are those determined in blocks 58 or 62.

At a block 66 the final air gap width is attained and may be considered as an absolute solution.

In support of the teachings herein, various analysis components may be used, including a digital and/or an analog system. For example, and referring again to FIG. 2, the optoelectronics such as the light source 23, the light detector 24, or the computer processing system 25 may include the digital and/or analog system. The system may have components such as a processor, storage media, memory, input, output, communications link (wired, wireless, pulsed mud, optical or other), user interfaces, software programs, signal processors (digital or analog) and other such components (such as resistors, capacitors, inductors and others) to provide for operation and analyses of the apparatus and methods disclosed herein in any of several manners well-appreciated in the art. It is considered that these teachings may be, but need not be, implemented in conjunction with a set of computer executable instructions stored on a computer readable medium, including memory (ROMs, RAMs), optical (CD-ROMs), or magnetic (disks, hard drives), or any other type that when executed causes a computer to implement the method of the present invention. These instructions may provide for equipment operation, control, data collection and analysis and other functions deemed relevant by a system designer, owner, user or other such personnel, in addition to the functions described in this disclosure.

Further, various other components may be included and called upon for providing for aspects of the teachings herein. For example, a power supply (e.g., at least one of a generator, a remote supply and a battery), cooling component, heating component, motive force (such as a translational force, propulsional force or a rotational force), magnet, electromagnet, sensor, electrode, transmitter, receiver, transceiver, antenna, controller, optical unit, optical connector, optical splice, optical lens, electrical unit or electromechanical unit may be included in support of the various aspects discussed herein or in support of other functions beyond this disclosure.

Elements of the embodiments have been introduced with either the articles "a" or "an." The articles are intended to mean that there are one or more of the elements. The terms "including" and "having" are intended to be inclusive such that there may be additional elements other than the elements listed. The conjunction "or" when used with a list of at least two terms is intended to mean any term or combination of terms. The terms "first" and "second" are used to distinguish elements and are not used to denote a particular order. The term "couple" relates to two devices being either directly coupled or indirectly coupled via one or more intermediate devices.

It will be recognized that the various components or technologies may provide certain necessary or beneficial functionality or features. Accordingly, these functions and features as may be needed in support of the appended claims and variations thereof, are recognized as being inherently included as a part of the teachings herein and a part of the invention disclosed.

While the invention has been described with reference to exemplary embodiments, it will be understood that various changes may be made and equivalents may be substituted for elements thereof without departing from the scope of the invention. In addition, many modifications will be appreciated to adapt a particular instrument, situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. An apparatus for estimating a property, the apparatus comprising:
   a hollow core tube;
   an input light guide disposed at least partially within hollow core tube;
   a second gap disposed within the hollow core tube and separated from the input light guide by an air gap width, the second gap being formed of a first solid material and having a second gap width;
   a third gap disposed at least partially within the hollow core tube and being further from the input light guide than the second gap, the third gap being formed of a second solid material and having a third gap width contacting a third material on an end opposite the second gap that is different than the first or second solid materials; and
   a reflective layer between the second gap and the third gap formed of a different material than at least one of the second and third gaps and the third material.

2. The apparatus of claim 1, wherein the first solid material is the same as the second solid material.

3. The apparatus of claim 1, wherein the second gap width may vary based on a change in an external condition.

4. The apparatus of claim 3, wherein the second gap width may not vary more than one fringe order of a mean wavelength of light provided to the input light guide.

5. The apparatus of claim 4, wherein the external condition is temperature.

6. The apparatus of claim 1, wherein the third gap width may vary based on a change in an external condition.

7. The apparatus of claim 6, wherein the third gap width may not vary more than one fringe order of a mean wavelength of light provided to the input fiber.

8. The apparatus of claim 7, wherein the external condition is pressure or temperature.

9. The apparatus of claim 1, wherein the apparatus is configured to be disposed in a borehole penetrating the earth.

10. The apparatus of claim 1, wherein an outer diameter of the input fiber is less than one millimeter.

11. The system of claim 9, wherein the first solid material is the same as the second solid material.

12. An apparatus for estimating a property, the apparatus comprising:
    a hollow core tube;
    an input light guide disposed at least partially within hollow core tube;

a second gap disposed within the hollow core tube and separated from the input light guide by an air gap width, the second gap being formed of a first solid material and having a second gap width;

a third gap disposed at least partially within the hollow core tube and being further from the input light guide than the second gap, the third gap being formed of a second solid material and having a third gap width contacting a third material on an end opposite the second gap that is different than the first or second solid materials;

wherein the first solid material is different than the second solid material.

13. The apparatus of claim 12, wherein the second gap directly contacts the third gap.

14. A system for estimating a property, the system comprising:

a hollow core tube;

an input light guide disposed at least partially within hollow core tube;

a second gap disposed within the hollow core tube and separated from the input light guide by an air gap width, the second gap being formed of a first solid material and having a second gap width;

a third gap disposed at least partially within the hollow core tube and being further from the input light guide than the second gap, the third gap being formed of a second solid material and having a third gap width contacting a third material on an end opposite the second gap that is different than the first or second solid materials;

a reflective layer between the second gap and the third gap formed of a different material than at least one of the second and third gaps and the third material;

a light source in optical communication with the input light guide and configured to transmit an input light signal; and a light detector in optical communication with the input light guide and configured to detect light reflections of the input light signal wherein the light reflections are related to the air gap width, the second gap width and the third gap width.

15. A system for estimating a property, the system comprising:

a hollow core tube;

an input light guide disposed at least partially within hollow core tube;

a second gap disposed within the hollow core tube and separated from the input light guide by an air gap width, the second gap being formed of a first solid material and having a second gap width;

a third gap disposed at least partially within the hollow core tube and being further from the input light guide than the second gap, the third gap being formed of a second solid material and having a third gap width contacting a third material on an end opposite the second gap that is different than the first or second solid materials;

a light source in optical communication with the input light guide and configured to transmit an input light signal; and a light detector in optical communication with the input light guide and configured to detect light reflections of the input light signal wherein the light reflections are related to the air gap width, the second gap width and the third gap width;

wherein the first solid material is different than the second solid material.

16. The system of claim 15, wherein the second gap directly contacts the third gap.

* * * * *